US008631092B2

(12) United States Patent
Molnar (10) Patent No.: US 8,631,092 B2
(45) Date of Patent: *Jan. 14, 2014

(54) EMBEDDED PROTOCOL OBJECTS

(75) Inventor: Ingo Molnar, Gyongyoa (HU)

(73) Assignee: Red Hat, Inc., Raleigh, NC (US)

( * ) Notice: Subject to any disclaimer, the term of this patent is extended or adjusted under 35 U.S.C. 154(b) by 1694 days.

This patent is subject to a terminal disclaimer.

(21) Appl. No.: 09/934,738

(22) Filed: Aug. 22, 2001

(65) Prior Publication Data

US 2002/0049834 A1     Apr. 25, 2002

Related U.S. Application Data

(60) Provisional application No. 60/227,510, filed on Aug. 24, 2000.

(51) Int. Cl.
  *G06F 15/16*    (2006.01)
  *G06F 13/00*    (2006.01)
  *G06F 13/28*    (2006.01)

(52) U.S. Cl.
  USPC ............................ 709/219; 709/217; 711/119

(58) Field of Classification Search
  USPC .......................................... 709/219; 707/505
  See application file for complete search history.

(56) References Cited

U.S. PATENT DOCUMENTS

| | | | |
|---|---|---|---|
| 5,515,538 A | 5/1996 | Kleiman | |
| 5,781,550 A | 7/1998 | Templin et al. | |
| 5,832,513 A | 11/1998 | Kennedy | |
| 5,835,914 A * | 11/1998 | Brim | 1/1 |
| 5,872,963 A | 2/1999 | Bitar et al. | |
| 5,946,458 A * | 8/1999 | Austin et al. | 358/1.15 |
| 5,974,430 A * | 10/1999 | Mutschler et al. | 715/505 |
| 6,011,803 A | 1/2000 | Bicknell et al. | |
| 6,034,963 A | 3/2000 | Minami et al. | |
| 6,098,112 A | 8/2000 | Ishijima et al. | |
| 6,179,489 B1 | 1/2001 | So et al. | |

(Continued)

FOREIGN PATENT DOCUMENTS

JP     09223027 A     8/1997

OTHER PUBLICATIONS

Iyengar, Arun et. al. "An Analysis of Web Server Performance." Global Telecommunications Conference, 1997. Globecom '97., IEEE, vol. 3, Nov. 3-8, 1997.*

(Continued)

*Primary Examiner* — Azizul Choudhury
(74) *Attorney, Agent, or Firm* — Steven B. Phillips; Moore & Van Allen PLLC (57) ABSTRACT

Embedded protocol objects. Dynamic and static protocol objects are mixed together at a server and included in a dynamic reply to a communication request made by a client application. In effect, static protocol objects can be embedded in dynamic replies, along with dynamic protocol objects. When a request is made by a client to receive a reply, such as a Web page using the HTTP application protocol, the server creates at least one dynamic protocol object to form at least a portion of the reply. The dynamic protocol object or objects are sent to the client application. Static protocol objects are then retrieved and sent to the client application to complete the reply to the application protocol request at the client application.

4 Claims, 6 Drawing Sheets

(56) References Cited

U.S. PATENT DOCUMENTS

| | | | |
|---|---|---|---|
| 6,209,036 B1* | 3/2001 | Aldred et al. | 709/229 |
| 6,246,683 B1 | 6/2001 | Connery et al. | |
| 6,256,712 B1* | 7/2001 | Challenger et al. | 711/141 |
| 6,279,001 B1* | 8/2001 | DeBettencourt et al. | 707/10 |
| 6,336,140 B1 | 1/2002 | Elgressy et al. | |
| 6,363,357 B1* | 3/2002 | Rosenberg et al. | 705/26 |
| 6,389,479 B1 | 5/2002 | Boucher et al. | |
| 6,405,252 B1* | 6/2002 | Gupta et al. | 709/224 |
| 6,427,173 B1 | 7/2002 | Boucher et al. | |
| 6,483,840 B1 | 11/2002 | Vogel | |
| 6,575,746 B2 | 6/2003 | Hirsch et al. | |
| 6,591,266 B1* | 7/2003 | Li et al. | 707/10 |
| 6,606,525 B1* | 8/2003 | Muthuswamy et al. | 700/52 |
| 6,615,088 B1* | 9/2003 | Myer et al. | 700/20 |
| 6,625,650 B2 | 9/2003 | Stelliga | |
| 6,658,480 B2 | 12/2003 | Boucher et al. | |
| 6,662,215 B1* | 12/2003 | Moskowitz et al. | 709/217 |
| 6,678,746 B1 | 1/2004 | Russell et al. | |
| 6,694,358 B1* | 2/2004 | Swildens et al. | 709/218 |
| 6,801,529 B1* | 10/2004 | McGrane et al. | 370/390 |
| 6,826,594 B1* | 11/2004 | Pettersen | 709/203 |
| 6,934,761 B1* | 8/2005 | Curtis | 709/237 |
| 6,988,142 B2 | 1/2006 | Molnar | |
| 7,096,418 B1* | 8/2006 | Singhal et al. | 715/205 |
| 7,174,506 B1* | 2/2007 | Dunsmoir et al. | 715/207 |

OTHER PUBLICATIONS

Pai, Vivek S. et. al. "IO-Lite: A Unified I/O Buffering and Caching System." ACM Transactions on Computer Systems, vol. 19, No. 1, Feb. 2000.*
Bar, Moshe. "Kernel Korner: kHTTPd, a Kernel-Based Web Server." Linux Journal, vol. 2000 Issue 76es, Aug. 2000.*
Huang, Yixiu et al, "Divergence Caching in Client-Server Architectures," Sep. 1994, IEEE, pp. 131-139.*
Porto, Fabio A. M. et al. "Persistent Object Synchronization with Active Relational Databased," Aug. 1999, IEEE, pp. 53-62.*
Preslan K. W. et al., "A 64-bit, shared disk file system for Linux", Mass Storage Systems, 1999 pp. 22-41.
Anderson, D. et al., "Failure-atomic file access in an interposed network storage system", Dept. of Computer Science, Duke University pp. 159-162.
Moon D. A., "Genera retrospective", Objective Orientation in Operating Systems, 1991 IEEE Comput. Soc., US (Oct. 17 1991) pp. 2-8.
Japanese Patent Office; Notice of Grounds for Rejection; May 28, 2010; issued in Japanese Patent Application No. 2007-270596.
Satoshi Moriai; Multimedia Computing(III); Journal of the Institute of Electronics, Information, and Communication Engineers; Japan; The Institute of Electronics, Information, and Communication Engineers; Jul. 25, 1997; vol. 80; No. 7, 740-745.
Red Hat, Inc., U.S. Appl. No. 09/934,658, Notice of Allowance, Feb. 28, 2005.

* cited by examiner

EMBEDDED PROTOCOL OBJECTS

CROSS-REFERENCE TO RELATED APPLICATIONS

This application claims priority from co-pending provisional patent application Ser. No. 60/227,510, filed Aug. 24, 2000 by the inventor hereof, the entire disclosure of which is incorporated herein by reference.

Much of what is disclosed in this application is also disclosed in application Ser. Nos. 09/934,658, entitled, "Method and Apparatus for Handling Communication Requests at a Server Without Context Switching," and 09/934,659, entitled, "Method and Apparatus for Atomic File Look-up," both filed on Aug. 22, 2001 and assigned to the assignee of the present application, both of which are incorporated herein by reference.

CROSS-REFERENCE TO COMPUTER PROGRAM LISTING APPENDIX

A portion of the present disclosure is contained in a compact disc, computer program listing appendix. The compact disc contains an MS-DOS file entitled "tux2-full.txt" created on Jun. 15, 2001, of 1,057 kilobytes. The contents of this file are incorporated herein by reference. Any references to "the appendix" or the like in this specification refer to the file contained on the compact disc.

The contents of this file are subject to copyright protection. The copyright owner has no objection to the reproduction by anyone of the patent document or the appendix as it appears in the Patent and Trademark Office patent files or records, but does not waive any other copyright rights by virtue of this patent application.

BACKGROUND

The Internet comprises a vast number of computers and computer networks that are interconnected through communication links. The communication links exchange digital information using the well-known, standard transmission control protocol/Internet protocol (TCP/IP). Application protocols such as hypertext transfer protocol (HTTP) and file transfer protocol (FTP) are used on top of TCP/IP. Similar or identical transmission protocols and application protocols are also used by modern computers to communicate via private networks, such as intranets and local area networks (LAN's). These application protocols allow a server computer system to send information to a remote client computer system. The remote client computer system can then display or otherwise make use of the information. In the case of HTTP, the information might be displayed in the form of a so-called World Wide Web page.

The dramatic increase in Internet usage and in other forms of client/server communication in recent years has meant that servers receive more and more requests and are handling more and more connections and responses. Therefore, the speed at which servers operate in terms of the number of requests handled in a given time period has become very important in the overall speed and performance of Internet and other computer communication systems.

One factor that adversely affects the performance of an operating system and applications installed on a server is the need for the server to repeatedly assemble and format the same reply repeatedly, using up overhead and instruction cycles each time. One example of such a reply is a Web page. If any part of the page changes for each "hit," the entire page must be reformatted and assembled to be sent to a browser. Such a page is referred to as a dynamic reply. The part of the page that changes is referred to as a dynamic object. Static replies or pages, by contrast, can be cached at the server and sent without having to be reassembled and formatted. But increased use of dynamic content on the Internet has made such static replies few and far between.

Often large portions of a Web page stay the same over many accesses by many different client applications or Web browsers. Sometimes only a time and date field or an advertisement changes. Yet the server must reassemble the complete page each time a browser requests it. If the same browser requests the page again, it is possible for the browser to cache static objects that form portions of the page, and only retrieve the dynamic objects. However many Web site operators set up their sites so that caching is not possible on browsers. In this case again, the complete Web page needs to be assembled each time it is requested.

SUMMARY

The present invention provides a way for dynamic and static protocol objects to be mixed together at a server and included in a dynamic reply to a communication request made by a client application. In effect, static protocol objects can be embedded in dynamic replies, along with dynamic protocol objects. If a reply, such as a Web page, requires content, only a small portion of which is dynamic, the reply can be created and sent using mostly cached, static protocol objects, resulting in a reply being sent more quickly and efficiently than is possible with prior-art server systems.

The invention allows a communication server to respond to an application protocol request received from a client application by creating at least one dynamic protocol object to form at least a portion of the reply. The reply is designed to be able to include embedded, static protocol objects. The dynamic protocol object or objects are sent to the client application. Static protocol objects are then retrieved and sent to the client application to complete the reply to the application protocol request at the client application. The static protocol object or objects are effectively embedded in the dynamic reply.

In one embodiment, the static protocol objects are stored in and retrieved from a protocol object cache within the operating system kernel on the server. The invention can be adapted to any communication application protocol. In one embodiment the replies are Web pages according to the HTTP protocol.

In example embodiments of the invention, computer program code is used to implement many aspects of the invention. The computer program can be stored on a medium. The medium can be magnetic, such as a diskette, tape, or fixed disk, or optical, such as a CD-ROM or DVD-ROM. The computer program code can also be stored in a semiconductor device. Additionally, the computer program can be supplied via the Internet or some other type of network. A workstation or computer system that is connected to a network typically runs the computer program code supplied as part of a computer program product. This computer system can also be called a "program execution system" or "instruction execution system." The computer program code in combination with the computer system forms the means to execute the method of the invention.

DETAILED DESCRIPTION OF ONE OR MORE EMBODIMENTS

The present invention is typically embodied in computer software or a computer program product. It should be understood that not every feature of the software described is necessary to implement the invention as claimed in any particular one of the appended claims. The complete software product is described rather to fully enable the invention. It should also be understood that throughout this disclosure, where a software process or method is shown or described, the steps of the method may be performed in any order or simultaneously, unless it is clear from the context that one step depends on another being performed first.

The embodiments of the present invention described are implemented in a computing platform based on the computer operating system commonly known as "Linux" that is available as open source directly over the Internet. Linux is also available through various vendors who provide service and support for the Linux operating system. Among these vendors are Red Hat, Inc., of Research Triangle Park, North Carolina, the assignee of the present invention. An example of computer program code in patch format that implements the invention is included in the appendix, and its use will be discussed later. Certain, more brief code samples are included in this specification to illustrate specific concepts where discussed. All of these examples will be readily understood by those of ordinary skill in the art. It will also be understood that Linux examples are shown for illustrative purposes only. The inventive concepts described herein can be adapted to any computing platform based on any operating system, including those based on Macintosh™, Unix™ and Windows™.

Finally, it should be understood the several block diagrams and flowcharts which are used to illustrate the inventive concepts are not mutually exclusive. Rather, each one has been tailored to illustrate a specific concept discussed. In many cases, the elements or steps shown in a particular drawing co-exist with others shown in a different drawing, but only certain elements or steps are shown for clarity. For example, the block diagrams of FIGS. 1 and 4 both show elements within an operating system kernel and user space. In actual software, all of the elements in both the drawings might be present. However, only the ones relevant to a particular feature are shown in each drawing for clarity.

Figure 1:
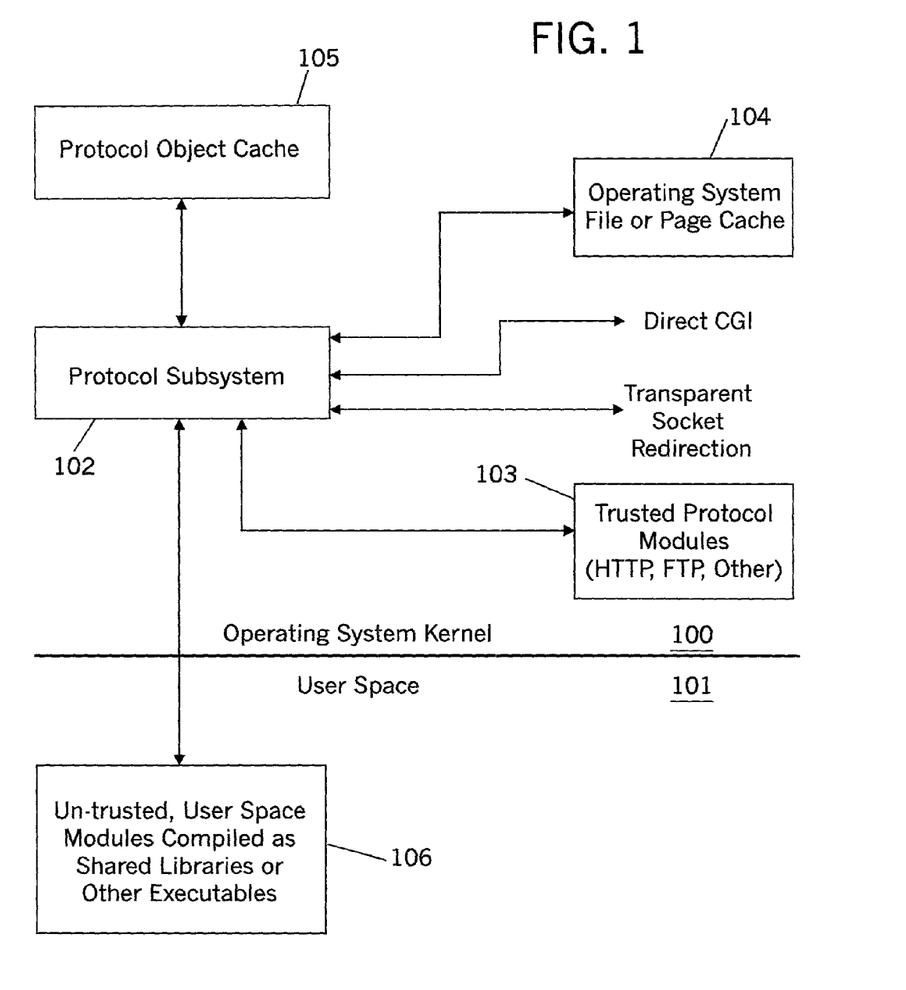
FIG. 1 is a block diagram that illustrates some features of software that implements an embodiment of the invention.

Turning to FIG. 1, a block diagram is presented that illustrates various elements of a software system having an operating system kernel, 100, and a user space, 101. The features that are illustrated by FIG. 1 are important to a computer platform or instruction execution system to be used as a server, and so the software system of FIG. 1 can be referred to as a "server system." The operating system kernel, or simply, "the kernel" is the part of the operating system software that handles hardware resources, provides fundamental functionality, and provides fundamental programming interfaces to applications. Such a programming interface is often referred to as an "application programming interface" or "API." In the present embodiment of the invention, the operating system kernel, 100, includes the capability to maintain a communication protocol stack through the use of an in-kernel, application protocol subsystem, 102. It is important to distinguish an application protocol such as HTTP or FTP from lower level protocols such as TCP/IP. Trusted protocol modules 103 are also included in the kernel and provide application protocol information and functionality to the protocol subsystem, 102. The protocols involved can be HTTP, FTP, or any other application protocol used for network communications, including so-called "meta application protocols" such as extended markup language (XML) and hypertext markup language (HTML), which use HTTP. It is to be understood that references to HTTP included herein are meant to include HTML and XML. A generic operating system cache, 104, also resides in the kernel and can be used to cache files or pages of information. Finally, a protocol object cache, 105, is also in the kernel and is operatively connected to protocol subsystem 102. The protocol object cache can be important to certain features of the software system to be discussed later. Note that, as shown in FIG. 1, the protocol subsystem in this example embodiment provides a direct common gateway interface (CGI) and transparent socket redirection.

It cannot be overemphasized that the operating system architecture discussed with FIG. 1 (and that discussed later with reference to FIG. 4) are representative examples. Some operating systems allow certain applications to be run in kernel space, but others to be run in user space. It is also possible in some circumstances for an application to run in both places, with some code running in kernel space, and other code running in user space.

User space 101 of FIG. 1 contains untrusted modules or other executables, 106. It is beneficial at this point to explain what is meant by "trusted" vs. "untrusted" software modules. As is known by those skilled in the art, most modern operating systems are designed so that applications or the software modules residing in user space are in a "sandbox" of sorts. This sandbox guarantees that modules in the operating system cannot be corrupted or adversely affected by what goes on in user space. This concept is implemented by the designing the operating system so that modules in user space are considered "untrusted" such that their access to operating system functions is limited. Modules inside the operating system kernel, by contrast, are "trusted" and have full access to operating system functions. In this example embodiment of the invention, high-level, communication protocol applications can reside as trusted modules inside the operating system kernel. These in-kernel protocol modules and the in-kernel protocol subsystem enable a server system to respond to application protocol requests without the operating system switching contexts. It is important to note that not all operating systems have a separate user space. Some operating systems execute applications within the operating system kernel space. In these cases however, the functional relationship between the operating system and the application is the same. The operating system handles hardware and provides API's, and the application uses an API to perform application tasks.

Operations in a computer system that do not cause context switching or any other processing schedule interruptions are often referred to as "atomic" operations. With the architecture just described, communications applications can do what would normally be "non-atomic" work without context switching. When a response needs to be generated, information about the application protocol request is stored in an in-memory, in-kernel request structure which enables the kernel to resume execution once a commensurate user space request structure is updated as if the response has already taken place. An example request structure for an HTTP request is shown below. In this particular case, the user request structure is shown; however, the kernel request structure is very similar, and can be easily derived from the user space request structure.

```
typedef  struct user_req_s {
            int version_major;
            int version_minor;
            int version_patch;
            int http_version;
            int http_method;
            int sock;
            int event;
            int thread_nr;
            void *id;
            void *priv;
            int http_status;
            int bytes_sent;
            char *object_addr;
            int module_index;
            char modulename [MAX_MODULENAME_LEN];
            unsigned int client_host;
            unsigned int objectlen;
            char query [MAX_URI_LEN];
            char objectname [MAX_URI_LEN];
            unsigned int cookies_len;
            char cookies [MAX_COOKIE_LEN];
            char content_type [MAX_FIELD_LEN];
            char user_agent [MAX_FIELD_LEN];
            char accept [MAX_FIELD_LEN];
            char accept_charset [MAX_FIELD_LEN];
            char accept_encoding [MAX_FIELD_LEN];
            char accept_language [MAX_FIELD_LEN];
            char cache_control [MAX_FIELD_LEN];
            char if_modified_since [MAX_FIELD_LEN];
            char negotiate [MAX_FIELD_LEN];
            char pragma [MAX_FIELD_LEN];
            char referer [MAX_FIELD_LEN];
            char *post_data;
            char new_date [DATE_LEN];
} user_req_t;
```

Figure 2:
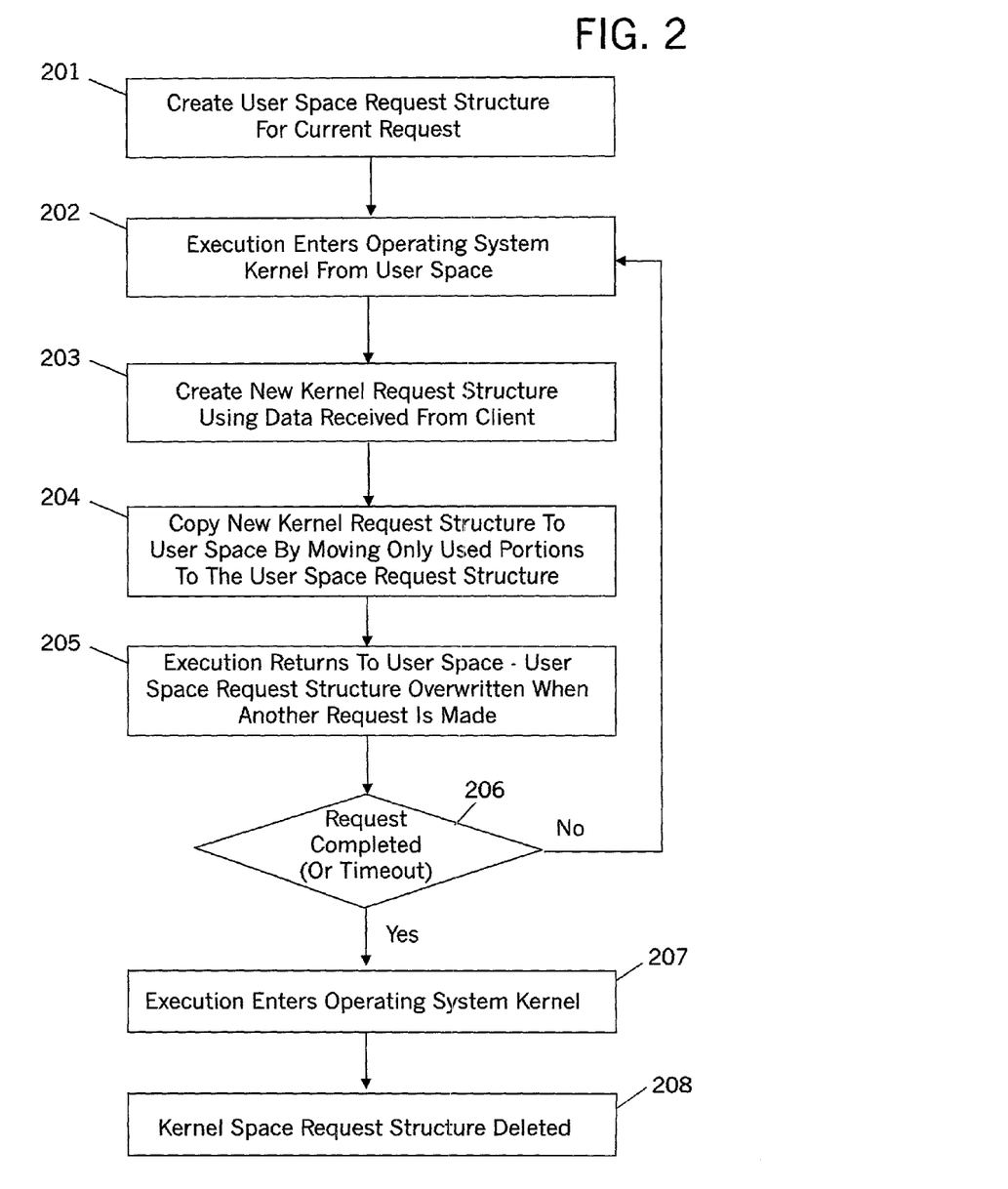
FIG. 2 is a flowchart illustrating a method performed by software that implements one embodiment of the invention.

FIG. 2 is a flowchart illustrating the method of responding to a request without context switching. At step 201 the user space request structure is created. At step 202, execution by the instruction execution system operating as a server system enters the operating system kernel. At step 203, a new kernel request structure is created to handle the request. The kernel request structure is populated with data received in conjunction with the request, usually from a client system making the request over the network. At step 204, the kernel request structure is copied to the user space by populating the user space request structure. This "copy" is most efficiently done by moving data related only to used portions of the request structures. In this case, a so-called, "private field" of the request structure would also be moved. The private field is an opaque pointer that can be used by applications for reference. At step 205, execution returns to user space, and the user space application continues operations as if the request has been handled. The user space request structure will be overwritten if another request needs to be handled. The kernel handles the request normally in due course (this step is not shown for clarity). At 206, the operating system monitors the request. If the request is completed, or a time out occurs, execution enters the operating system kernel at step 207, and the kernel request structure is deleted at 208 to save memory resources. If the request cannot be completed, but a time out has not occurred, the system will maintain the request and the request will be returned as the current request to user space after the I/O operation(s) for that request has finished. A "suspended" request will not cause execution to be suspended. It should also be noted that the request is suspended—not the task, so that execution continues in user space. It is also possible for the request to be suspended on more than one I/O operation.

Figure 3:
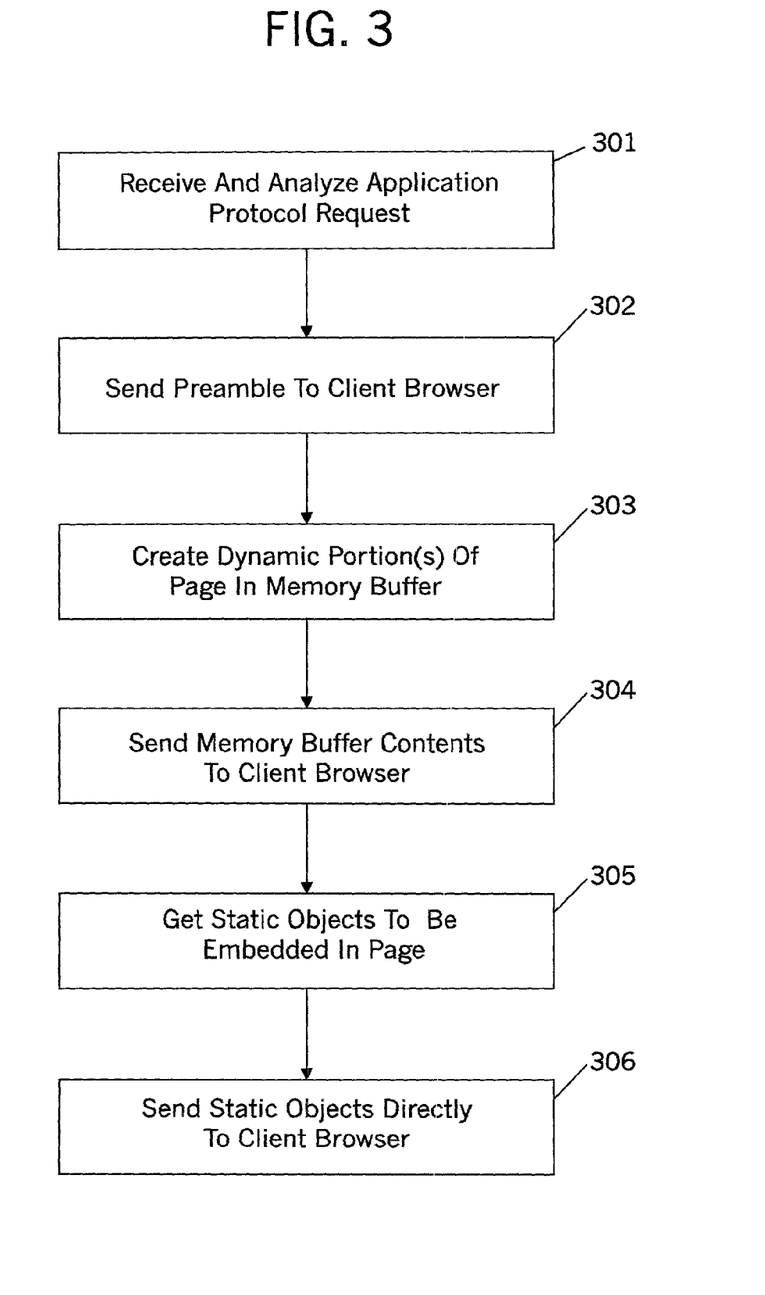
FIG. 3 is another flowchart illustrating a method performed by software that implements an embodiment of the invention.

FIG. 3 illustrates another process included in the operating system that embodies the invention; that of embedding static protocol objects in responses, such as HTTP Web pages, sent to a client application in response to an application protocol request. It should be noted that this illustrating is based on HTTP Web pages by way of example only. It may be possible to implement the invention with other application protocols, such as FTP. In this embodiment of the invention, the static protocol objects are stored in the protocol object cache, 105, of FIG. 1, but they can also reside in the generic operating system cache. At step 301 of FIG. 3 the server receives and analyses the application protocol request. A sample application protocol request in the form of an HTTP request is shown below. Such a request is normally terminated by two newline characters.

```
GET / HTTP/1.0
    User-Agent: Wget/1.6
    Host: www.redhat.com
    Accept: */*
```

At step 302 a preamble is sent back to the client. The preamble is the header portion of an HTTP response or reply. An example header portion is shown below.

```
HTTP/1.1 200 OK
    Date: Tue, 03 Jul 2001 10:45:31 GMT
    Server: Apache/1.3.19 (Unix) (Red-Hat/Linux) mod_ssl/2.8.1
OpenSSL/0.9.5a
    Connection: close
    Content-Type: text/html
```

At step 303 the optional dynamic portions of the reply page are created within a memory buffer on the server. The dynamic portions are made up of dynamic protocol objects, which form part of the reply. The reply can also have static protocol objects embedded within. The dynamic protocol objects are sent to the client application at step 304. At step 305 the static parts of the reply page, or static protocol objects are retrieved from the protocol object cache or the generic operating system cache. The static objects are sent to the client application at step 306, where they are embedded in the reply so that a complete reply can be displayed at the client system.

Figure 4:
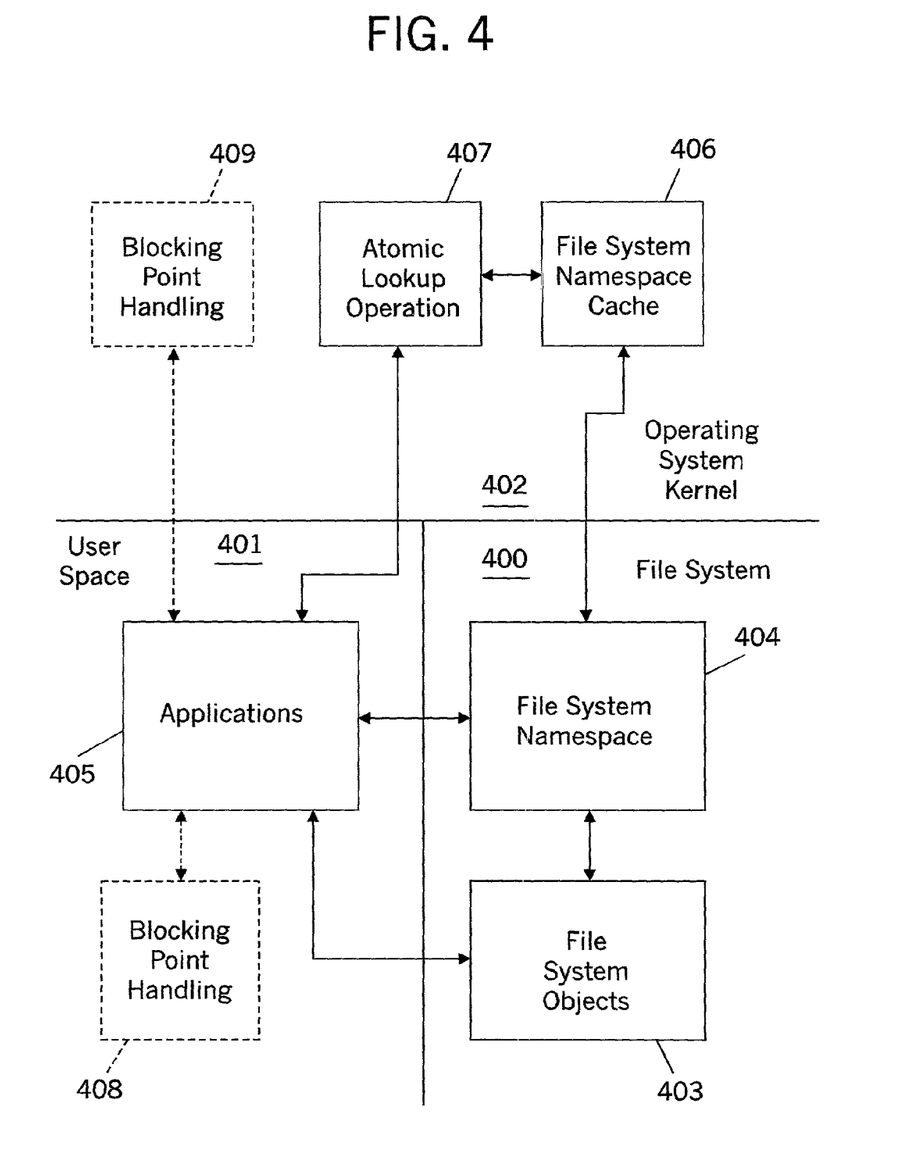
FIG. 4 is a block diagram that illustrates some features of software that implements an embodiment of the invention.

FIG. 4 is another block diagram of an embodiment of the operating system of the present invention. In this case, the block diagram is constructed to illustrate the operation of the atomic file look-up feature. FIG. 4 includes three main segments of an operating system environment: file system 400, user space 401, and operating system kernel 402. File system 400 includes file system objects 403 in the file system space. File system objects, or simply "files" are the building blocks of the file system space. In effect, they are containers of information. There are various types of file system objects, including regular files, directories, and symbolic links. A symbolic link provides a way to create a new file that in fact just points to an existing file. A symbolic link is also referred to as a soft link. The linking is done via a string including separator characters. The separator is the "/" (slash) character on Linux and Unix systems and for Internet URL's, and it is the "\" (backslash) character on Windows systems.

Note that the file system object name or file name is a string of characters which do not include the separator character, for example, "homework.doc". Every file system object has a file system object name. A file system object path or "file path" however is a string of characters which usually start with the separator character, and specify various parts of a path which will locate the file. In some systems this file path can also be called a directory path or folder path, for example, "/home/joe/docs/homework.doc".

The file system of FIG. 4 also includes the file system namespace, 404. The file system namespace refers to all file paths within the system. The paths for all the files are typically stored on the file system device in the form of directories. The user space, 401, shown in FIG. 4 is where applications 405 typically reside. These applications make use of the file system objects, 403, that are kept within file system 400. In order to make use of a not-yet-used file, the application and operating system perform a file system namespace operation. Such an operation is performed, for example, to open, read or write to a file, rename a file, or move it between directories. There are other, well-known file system namespace operations as well. For purposes of this disclosure, any of these file system namespace operations are generically referred to as "opening a file", processing a "file open request", performing a file operation or the like. In the prior art, if an application wanted to read the first 1000 bytes of the "/home/joe/docs/homework.doc" file, it would contain computer program code similar to what is shown in the following C example.

```
fd = open ("/home/joe/docs/homework.doc", O_RDONLY);
read (fd, buf, 1000);
close (fd);
```

After executing these three system-calls, the operating system kernel will have put the first 1000 bytes of the file into the memory buffer, "buf".

The operating system kernel includes a file system namespace cache, 406. The "open" system-call, as shown above, will access the file system name-space cache internally, to speed up access to files, once their path is stored in the file system namespace cache. The file system name space cache is also sometimes called a "dentry cache". Note that the namespace cache does not cache file contents. It might cache file attributes. File contents are cached in a separate data structure, such as the generic cache shown in FIG. 1, often called the "page cache", as is well-known and has been omitted from FIG. 4 for clarity.

In the prior art as illustrated above, the kernel will get to the file whatever it takes in terms of time and resources, and it is transparent to the application whether the file path with the file path was already present in the namespace cache or not. If not, the kernel would read file name details from disk, and the processing associated with the application will be suspended and context switches occur until that I/O has finished, creating a serious performance impact.

In contrast to the prior art just described, the system of FIG. 4 includes an atomic lookup operation, 407, which implements the atomic file look-up according to this embodiment of the invention. The atomic file lookup empowers an application, 405, to detect whether a file is already cached within the namespace cache, or not. The following code shows how the feature is used in practice.

```
fd = open ("/home/joe/docs/homework.doc", O_RDONLY | O_ATOMICLOOKUP);
if (fd == -EWOULOBLOCKIO) {
    /*
     * The file name was not yet cached, bounce this open () to another
     * process:
     */
    return -1;
}
read (fd, buf, 1000);
close (fd);
```

Note the "O_ATOMICLOOKUP" flag and the new "-EWOULDBLOCKIO" return code for the open system-call. Upon learning that the file path is not yet cached, the application can bounce or redirect the file open to another process, as determined appropriate by the application developer. In some cases this process may be a process that performs blocking point handling.

The blocking point handling process can reside in the user space at 408 of FIG. 4, or in the kernel at 409 of FIG. 4. A "blocking point" is a point where a lookup would cause a possible context switch. "Handling the blocking point" might involve bouncing this lookup to another process/thread, which can manage the file open in a way that improves performance.

Figure 5:
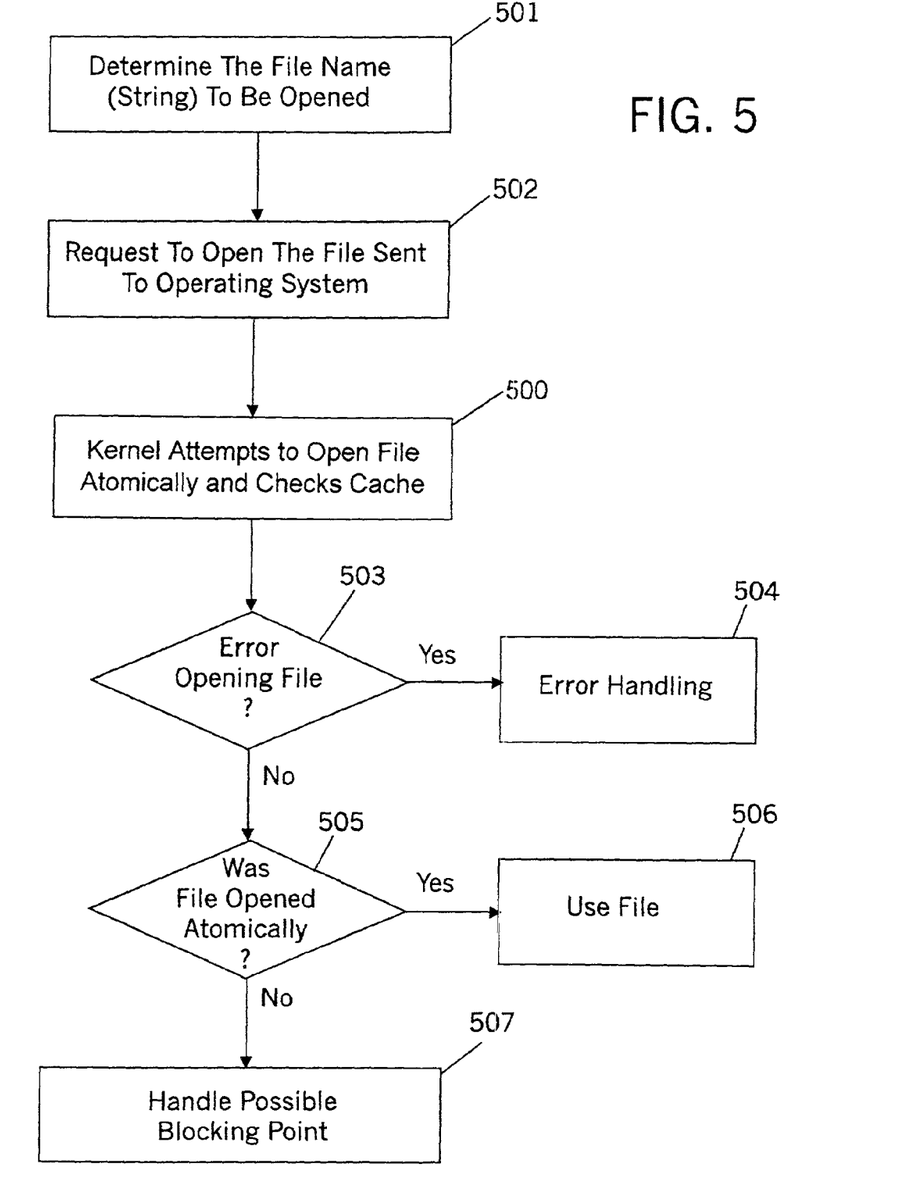
FIG. 5 is a flowchart illustrating a method performed by software that implements one embodiment of the invention.

FIG. 5 illustrates one example of the atomic look-up operation in flowchart form. At step 501 an application determines what file name, as designated by a character string, is to be opened. At 502 the file open request is made to the operating system. At step 500 the operating system kernel receives the request and attempts to open the file atomically. In order to attempt the atomic open, the kernel checks the file system namespace cache for the appropriate file path. Step 503 is a decision point that checks for errors such as the lack of existence of such a file. This process is handled in the same way as in the prior art. If there is an error, it is handled by an error handling routine at 504. If there is no error, processing continues. The operating system kernel notifies the application at step 505 as to whether the file was or is being opened atomically because its path was stored in the file system namespace cache. If, the file was opened atomically, the file is used at step 506. If not, since the application has been notified of the fact that an atomic open was not possible at step 505, a possible blocking point is handled at step 507.

Note that in this embodiment, the application does not send an inquiry as to whether the file path is cached. It simply notifies the operating system kernel that it wants to open a file atomically. If the kernel can comply because the file path is cached, the file is opened and a handle is returned to the application. If the file path is not cached, then the file is not opened, and -EWOULDBLOCKIO is returned to the application. With respect to the discussion herein of this feature, the terminology "was opened", "could be opened", "is being opened" and the like is used interchangeably. Likewise, the terminology regarding a file operation such as "was performed", "is being performed", "could be performed, and the like is used interchangeably. The operation of the invention is the same regardless of the exact timing of the checking of the cache, the file opening, and the notification from the operating system kernel to an application.

There are many variations of the operating system architecture described above, any of which, can also include the atomic look-up operation. For example, the file system device does not have to reside on the computer system that is maintaining the operating system kernel, but can instead be accessed over a network. In this case, the file system namespace and be located with the networked file system device, located on the system that is maintaining the operating system kernel, or distributed in both places. It is also important to note that not all operating system environments have a user space as a separate protection domain. In some operating systems, for example, those commonly used with embedded processors, applications are maintained and executed within the operating system kernel. In this case, the operating system still provides API's for applications, and the operating system still communicates with an application through its API, just the same as if the application were running in a user space.

Included at the end of this specification before the claims is one example of a source code listing showing code that implements the atomic look-up feature. This source code listing is entitled, "Source Code Listing Submitted as Part of the Specification." The source code is in the well-known differential patch format. It patches the publicly available version 2.4.2 of the Linux operating system, an open source operating system that can be acquired over the Internet, and from companies that provide support for it, such as Red Hat, Inc., the assignee of the present application. The code contained in the source code appendix for the present application, discussed below, also implements the atomic look-up feature.

Figure 6:
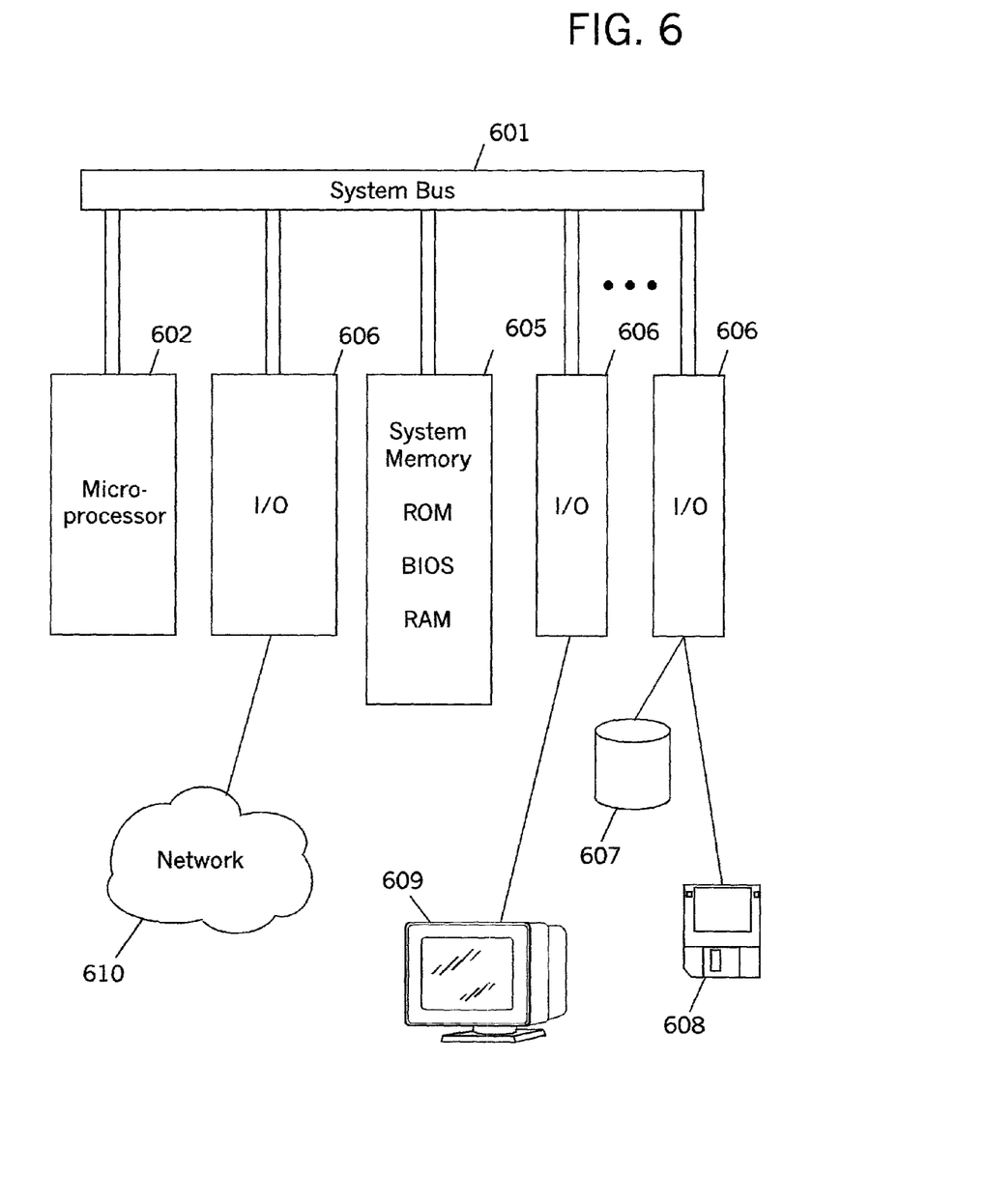
FIG. 6 is a block diagram of a computer system that is implementing an embodiment of the invention.

As previously discussed, in some embodiments, the invention is implemented through computer program code operating on a programmable computer system or instruction execution system such as a personal computer or workstation, or other microprocessor-based platform. FIG. 6 illustrates further detail of a computer system that is implementing the invention in this way. System bus 601 interconnects the major components. The system is controlled by microprocessor 602, which serves as the central processing unit (CPU) for the system. System memory 605 is typically divided into multiple types of memory or memory areas such as read-only memory (ROM), random-access memory (RAM) and others. The system memory may also contain a basic input/output system (BIOS). A plurality of general input/output (I/O) adapters or devices, 606, are present. Only three are shown for clarity. These connect to various devices including a fixed disk drive, 607, a diskette drive, 608, network, 610, and a display, 609. Computer program code instructions for implementing the functions of the invention are stored on the fixed disk, 607. When the system is operating, the instructions are partially loaded into memory, 605 and executed by microprocessor 602. Optionally, one of the I/O devices is a network adapter or modem for connection to network, 610, which may be the Internet. It should be noted that the system of FIG. 6 is meant as an illustrative example only. Numerous types of general-purpose computer systems are available and can be used.

Elements of the invention may be embodied in hardware and/or software as a computer program code (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system such as that shown in FIG. 6. Such a medium is illustrated graphically in FIG. 6 to represent the diskette drive. A computer-usable or computer-readable medium may be any medium that can contain, store, communicate, or transport the program for use by or in connection with an instruction execution system. The computer-usable or computer-readable medium, for example, an electronic, magnetic, optical, electromagnetic, infrared, or semiconductor system. The medium may also be simply a stream of information being retrieved when the computer program product is "downloaded" through a network such as the Internet. Note that the computer-usable or computer-readable medium could even be paper or another suitable medium upon which a program is printed.

The appendix to this application includes source code in differential patch format that implements the features described in this specification. The source code is intended to patch a version of the Linux operating system, an open source operating system that can be acquired over the Internet, and from companies that provide support for it, such as Red Hat, Inc., the assignee of the present application. The code is intended to patch version 2.4.5 of the Linux operating system, which has already been patched by the well-known, so-called, "ac4" patch. Version 2.4.5 of Linux is available, among other places, at: www.kernel.org/pub/linux/kernel/v2.4/linux-2.4.5.tar.gz. The above-mentioned ac4 patch is available, among other places, at: www.kernel.org/pub/linux/kernel/people/alan/2.4/patch-2.4.5-ac4.gz. A copy of a Linux operating system that includes all the features described herein can be constructed by downloading the files mentioned above, and entering, on a Linux system:

```
tar xzf linux-2.4.5.tar.gz
    gzip -d patch-2.4.5-ac4.gz
    cd linux
    patch -p1 < ../patch-2.4.5-ac4
    cd ..
    patch -p0 < tux2-full.txt
```

Specific embodiments of an invention are described herein. One of ordinary skill in the computing arts will quickly recognize that the invention has other applications in other environments. In fact, many embodiments and implementations are possible. The following claims are in no way intended to limit the scope of the invention to the specific embodiments described above, Source Code Listing Submitted as Part of the Specification

```
--- linux/fs/namei.c.orig    Tue Apr 17 13:18:46 2001
+++ linux/fs/namei.c         Tue Apr 17 13:18:52 2001
@@ -423,9 +423,13 @@
 {
        struct dentry *dentry;
        struct inode *inode;
-       int err;
+       int err, atomic;
        unsigned int lookup_flags = nd->flags;
+       atomic = 0;
+       if (lookup_flags & LOOKUP_ATOMIC)
+          atomic = 1;
+
        while (*name=='/')
              name++;
        if (!*name)
@@ -494,6 +498,9 @@
        /* This does the actual lookups.. */
        dentry = cached_lookup (nd->dentry, &this, LOOKUP_CONTINUE);
        if (!dentry) {
+             err = -EWOULDBLOCKIO;
+             if (atomic)
+                break;
              dentry = real_lookup (nd->dentry, &this, LOOKUP_CONTINUE);
              err = PTR_ERR(dentry);
              if (IS_ERR(dentry))
@@ -557,6 +564,9 @@
        }
        dentry = cached_lookup (nd->dentry, &this, 0);
        if (!dentry) {
+             err = -EWOULDBLOCKIO;
+             if (atomic)
+                break;
              dentry = real_lookup (nd->dentry, &this, 0);
              err = PTR_ERR (dentry);
              if (IS_ERR(dentry))
@@ -891,6 +901,8 @@
        if (f & O_DIRECTORY)
              retval |= LOOKUP_DIRECTORY;
+       if (f & O_ATOMICLOOKUP)
+             retval |= LOCKUP_ATOMIC;
        return retval;
 }
--- linux/include/linux/fs.h.orig  Tue Apr 17 13:18:51 2001
+++ linux/include/linux/fs.h       Tue Apr 17 13:18:52 2001
@@ -1203,6 +1203,7 @@
  #define LOOKUP_POSITIVE     (8)
  #define LOOKUP_PARENT       (16)
  #define LOOKUP_NOALT        (32)
 +#define LOOKUP_ATOMIC       (64)
  /*
   * Type of the last component on LOOKUP_PARENT
   */
--- linux/include/asm-i386/fcntl.h.orig    Fri Sep 22 23:21:19 2000
+++ linux/include/asm-i386/fcntl.h         Tue Apr 17 13:18:52 2001
@@ -20,6 +20,7 @@
  #define O_LARGEFILE     0100000
  #define O_DIRECTORY     0200000      /* must be a directory */
  #define O_NOFOLLOW      0400000      /* don't follow links */
 +#define O_ATOMICLOOKUP  01000000 /* do atomic file lookup */
  #define F_DUPFD         0            /* dup */
  #define F_GETFD         1            /* get close_on_exec */
--- linux/include/asm~alpha/fcntl.h.Orig   Sun Oct 8 18:04:04 2000
+++ linux/include/asm-alpha/fcntl.h        Tue Apr 17 13:18:52 2001
@@ -21,6 +21,8 @@
  #define O_DIRECTORY     0100000      /* must be a directory */
  #define O_NOFOLLOW      0200000      /* don't follow links */
  #define O_LARGEFILE     0400000      /* set by the kernel on every open */
 +#define O_ATOMICLOOKUP   01000000 /* do atomic file lookup */
+
  #define F_DUPFD         0            /* dup */
  #define F_GETFD         1            /* get close_on_exec */
--- linux/include/asm-sparc/fcntl.h.orig   Tue Oct 10 19:33:52 2000
+++ linux/include/asm-sparc/fcntl.h        Tue Apr 17 13:18:52 2001
@@ -20,6 +20,7 @@
```

-continued

```
  #define O_DIRECTORY     0x10000    /* must be a directory */
  #define O_NOFOLLOW      0x20000    /* don't follow links */
  #define O_LARGEFILE     0x40000
 +#define O_ATOMICLOOKUP  0x80000 /* do atomic file lookup */
  #define F_DUPFD         0          /* dup */
  #define F_GETFD         1          /* get close_on_exec */
--- linux/include/asm-sparc64/fcntl.h.orig    Tue Oct 10 19:33:52 2000
+++ linux/include/asm-sparc64/fcntl.h  Tue Apr 17 13:18:52 2001
@@ -20,6 +20,7 @@
  #define O_DIRECTORY     0x10000    /* must be a directory */
  #define O_NOFOLLOW      0x20000    /* don't follow links */
  #define O_LARGEFILE     0x40000
 +#define O_ATOMICLOOKUP  0x80000 /* do atomic file lookup */
  #define F_DUPFD         0          /* dup */
  #define F_GETFD         1          /* get close_on_exec */
--- linux/include/asm-ia64/fcntl.h.orig       Tue Oct 10 02:54:58 2000
+++ linux/include/asm-ia64/fcntl.h     Tue Apr 17 13:18:52 2001
@@ -28,6 +28,7 @@
  #define O_LARGEFILE     0100000
  #define O_DIRECTORY     0200000    /* must be a directory */
  #define O_NOFOLLOW      0400000    /* don't follow links */
 +#define O_ATOMICLOOKUP  01000000 /* do atomic file lookup */
  #define F_DUPFD         0          /* dup */
  #define F_GETFD         1          /* get close_on_exec */
```

I claim:

1. In a communication server, a method of responding to a client application of a computer, the method comprising:

receiving, from the client application, an application protocol request corresponding to a response that can be displayed as a combination of a dynamic portion and a static portion, wherein the dynamic portion comprises a portion of the response that changes, and wherein the static portion comprises a portion of the response that includes static protocol objects that are stored at a server prior to receiving the application protocol request;

establishing by the server a user space request structure corresponding to the application protocol request;

creating by the server a kernel request structure corresponding to the application protocol request, using data received from the client application in conjunction with the application protocol request;

updating by the server the user space request structure in accordance with the kernel request structure so that an operating system at the server can respond to the application protocol request without context switching;

creating, by the server, the dynamic portion of the response;

sending the dynamic portion of the response to the client application;

retrieving, at the server, the static portion of the response from a cache disposed in an operating system kernel of the server, wherein the server is separate from the computer, and wherein the static portion of the response is identified as static by the server; and sending the static portion of the response that is static from the server to the client application of the computer so that the server sends the response to the request using previously-cached static protocol objects.

2. The method of claim 1 wherein the cache disposed within the operating system kernel is a protocol object cache.

3. The method of claim 1 wherein the application protocol request and the reply are formatted according to a hypertext transfer protocol (HTTP).

4. The method of claim 2 wherein the application protocol request and the reply are formatted according to a hypertext transfer protocol (HTTP).

* * * * *

UNITED STATES PATENT AND TRADEMARK OFFICE
CERTIFICATE OF CORRECTION

| | | |
|---|---|---|
| PATENT NO. | : 8,631,092 B2 | Page 1 of 1 |
| APPLICATION NO. | : 09/934738 | |
| DATED | : January 14, 2014 | |
| INVENTOR(S) | : Ingo Molnar | |

It is certified that error appears in the above-identified patent and that said Letters Patent is hereby corrected as shown below:

On the Title page, please change (75) Inventor to:

Ingo Molnar, Gyongyos (HU)

Signed and Sealed this
Fifteenth Day of April, 2014

Michelle K. Lee
*Deputy Director of the United States Patent and Trademark Office*